US012569827B2

(12) United States Patent
    Dorsch

(10) Patent No.:  US 12,569,827 B2
(45) Date of Patent:    Mar. 10, 2026

(54) PELLETIZED COMPOSITIONS FOR LIQUID SOLIDIFICATION AND MOISTURE RETENTION AND METHODS OF MAKING AND USING THE SAME

(71) Applicant: Martlin Distributing, LLC, Baden, PA (US)

(72) Inventor: Michael Gerard Dorsch, Baden, PA (US)

( * ) Notice: Subject to any disclaimer, the term of this patent is extended or adjusted under 35 U.S.C. 154(b) by 498 days.

(21) Appl. No.: 18/097,020

(22) Filed: Jan. 13, 2023

(65) Prior Publication Data

US 2023/0211315 A1      Jul. 6, 2023

Related U.S. Application Data

(63) Continuation       of       application       No. PCT/US2021/041393, filed on Jul. 13, 2021.

(60) Provisional application No. 63/050,985, filed on Jul. 13, 2020.

(51) Int. Cl.
| | |
|---|---|
| *B01J 20/24* | (2006.01) |
| *B01J 20/26* | (2006.01) |
| *C02F 1/28* | (2023.01) |
| *C02F 11/12* | (2019.01) |
| *C05G 3/80* | (2020.01) |

(52) U.S. Cl.
CPC ............. *B01J 20/24* (2013.01); *B01J 20/262* (2013.01); *C02F 1/286* (2013.01); *C02F 11/12* (2013.01); *C05G 3/80* (2020.02)

(58) Field of Classification Search
CPC . B01J 20/24; B01J 20/262; C05G 3/80; C02F 1/286; C02F 11/12
See application file for complete search history.

(56) References Cited

U.S. PATENT DOCUMENTS

| | | |
|---|---|---|
| 3,269,824 A | 8/1966 | Aswell |
| 4,217,965 A | 8/1980 | Cremeans |
| 5,082,563 A | 1/1992 | Webb et al. |
| 5,147,852 A | 9/1992 | Cowan et al. |
| 5,456,733 A | 10/1995 | Hamilton, Jr. |
| 6,076,299 A | 6/2000 | Spittle et al. |
| 6,630,429 B1 | 10/2003 | Cremeans |
| 9,662,634 B2 | 5/2017 | Dorsch |
| 2004/0024092 A1 | 2/2004 | Soerens et al. |
| 2006/0121075 A1 | 6/2006 | Gilo et al. |
| 2010/0006035 A1 | 1/2010 | Spittle et al. |
| 2010/0025039 A1 | 2/2010 | Roddy |

(Continued)

FOREIGN PATENT DOCUMENTS

| | | |
|---|---|---|
| CA | 1129122 A | 8/1982 |
| WO | WO 2022/015708 | 1/2022 |

*Primary Examiner* — Benjamin L Lebron
(74) *Attorney, Agent, or Firm* — Blynn L. Shideler; Krisanne Shideler; BLK Law Group

(57) ABSTRACT

A method of using a pelletized composition for liquid solidification and moisture retention includes the steps of: Providing a pelletized absorption material having i) at least 60% by weight agricultural fibers; and ii) 0.1-20% by weight superabsorbent polymer, wherein the pellets are substantially uniform and have a density of less than 40 LBS/Cubic Foot; and Blending the pelletized absorption material with one of i) Sludge, ii) Landfill leachate; iii) material used in hydroseeding; iv) grass seeds, fertilizer, and/or mulch to form a soil amendment; v) settling pond; and vi) wastewater streams.

20 Claims, 2 Drawing Sheets

(56)　　　　　　　References Cited

U.S. PATENT DOCUMENTS

| 2011/0094968 | A1 |  | 4/2011 | Spittle et al. |  |
|---|---|---|---|---|---|
| 2015/0090933 | A1 |  | 4/2015 | Morris |  |
| 2016/0214081 | A1 | * | 7/2016 | Lipscomb | B01J 20/2803 |
| 2016/0251918 | A1 |  | 9/2016 | Dorsch |  |
| 2016/0346981 | A1 | * | 12/2016 | Lipscomb | A01K 1/0154 |
| 2019/0350162 | A1 | * | 11/2019 | Lipscomb | B01J 20/3007 |

* cited by examiner

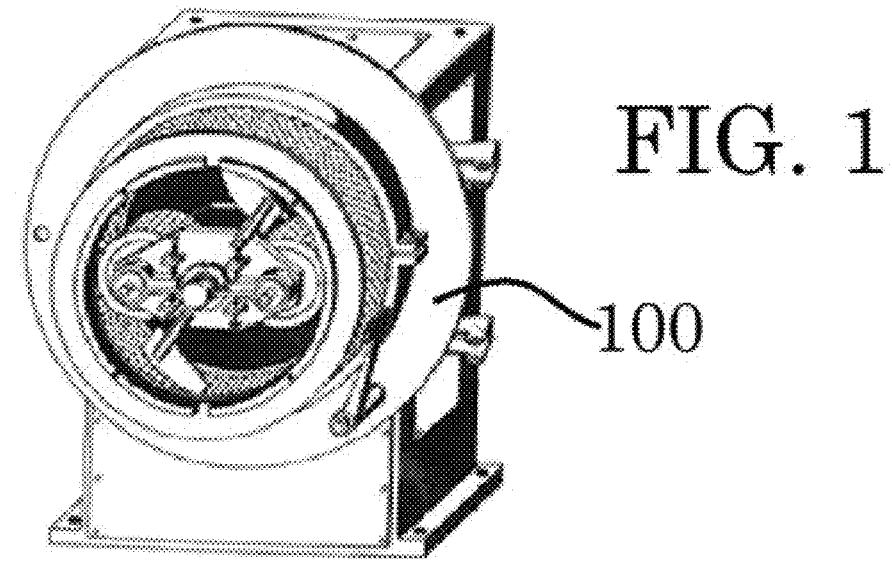
FIG. 1
100
FIG. 2
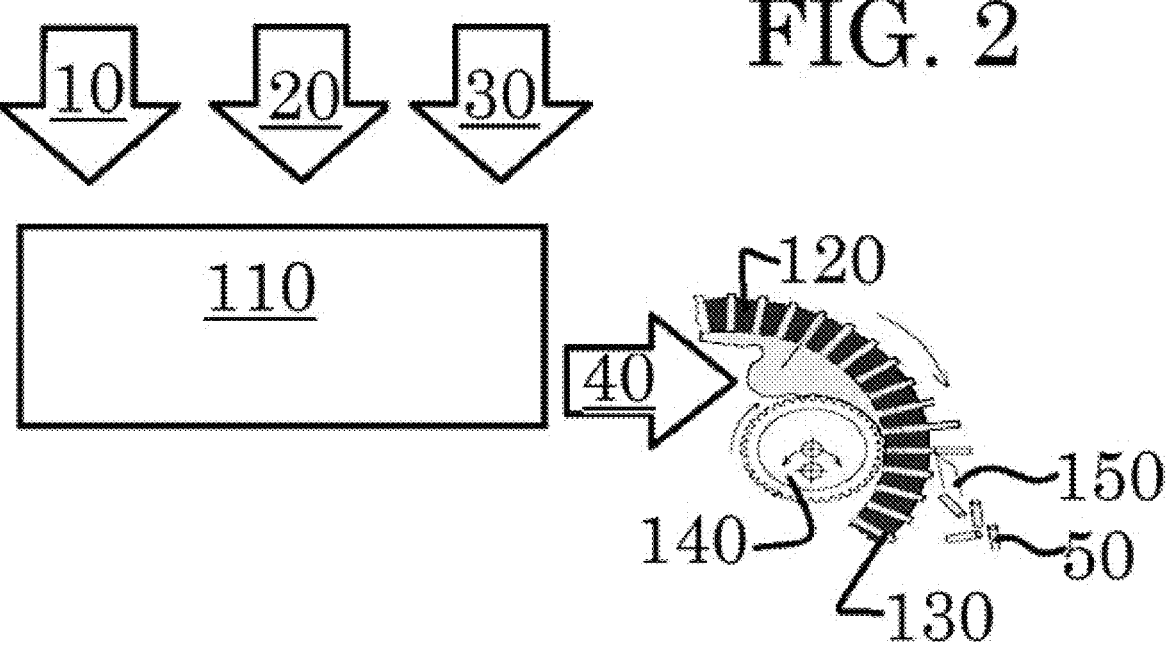

PELLETIZED COMPOSITIONS FOR LIQUID SOLIDIFICATION AND MOISTURE RETENTION AND METHODS OF MAKING AND USING THE SAME

RELATED APPLICATIONS

The present application is a continuation of international patent application serial number PCT/US2021/041393 filed Jul. 13, 2021 titled "Pelletized Compositions for Liquid Solidification and Moisture Retention and Methods of Making and using the same" which is incorporated herein by reference. International patent application serial number PCT/US2021/041393 claims the benefit of U.S. Provisional patent application Ser. No. 63/050,985 filed Jul. 13, 2020 titled "Pelletized Compositions for Liquid Solidification and Moisture Retention and Methods of Making and using the same" which is incorporated herein by reference.

BACKGROUND OF THE INVENTION

1. Field of the Invention

This invention generally relates to pelletized composition for liquid solidification and moisture retention and methods of making and using the same.

2. Background Information

Waste water is generally broadly defined as used water from any combination of domestic, industrial, commercial or agricultural activities, surface runoff or stormwater, and any sewer inflow or sewer infiltration. Waste water is also defined as a byproduct of domestic, industrial, commercial or agricultural activities. As the world's population grows the treatment of waste water streams is becoming an increasingly important concern worldwide. Beginning in 1972 with the Clean Water Act, the United States substantially increased government regulations on the treatment of liquids such as waste water streams.

Using pelletized agricultural based water treatment materials is generally known in a variety of specific applications. For example, U.S. Pat. No. 4,217,965 teaches a method for preventing loss of aqueous drilling fluid to porous formations penetrated by a well bore during drilling operations for oil and gas which utilizes pelleted cottonseed hulls as the lost circulation material which is added to the drilling fluid and pumped down the well bore. The pelleted cottonseed hulls are composed of cottonseed hulls, cottonseed meal, bentonite, a residual amount of cottonseed lint and a surface active agent. The cottonseed hulls, cottonseed meal, bentonite, residual lint and surface active agent are heated in the presence of steam and compressed to form pellets. Because the pellets are in a compressed form, they do not expand when added to the drilling fluid until they are well down the well bore. The pelleted cottonseed hulls may also contain cottonseed oil. The pelleted cottonseed hulls are well known and widely used in the dairy cattle industry as a pelleted feed material.

U.S. Pat. No. 5,082,563 teaches the use of a cellulose pellet used to treat an oil spill.

U.S. Pat. No. 5,147,852 teaches a well seepage treatment in the form of a particulate additive, which may be pelletized, to decrease the seepage loss of the fluid to fluid permeable formations contacted by the composition wherein the additive comprises a cellulosic material.

U.S. Pat. No. 6,630,429 teaches a lost circulation material for well application comprising primarily pelletized cottonseed hulls.

U.S. Patent Application Publication 2011-0094968 teaches flocculant compositions, which may be pelletized, containing a cellulosic compound, a superabsorbent polymer (SAP), and a flocculent, are useful for preventing the formation of an aqueous phase during the shipping of fly ash slurries.

Using pelletized agricultural based water or moisture retention material is also generally known. For example, U.S. Pat. No. 3,269,824 teaches a waste paper soil conditioning and fertilizer pellet.

U.S. Pat. No. 5,456,733 teaches mulching pellets from waste paper scrap which incorporates particulate water-insoluble, swellable, gel-forming polymer into the pellet-forming composition.

U.S. Pat. No. 6,076,299 teaches "mulching pellets" made from finely divided paper and wood, a clay binder, a guar gum, and a surfactant wherein the pellets absorb at least four times their weight in water.

U.S. Patent Application Publication 2015-0090933 teaches a fiber mulch, which may be pelleted, comprising a cellulose based material, for example, shredded recycled paper fibers, and a shredded wheat straw combined with tackifiers and surfactants.

U.S. Patent Application Publication 2010-0006035 teaches an animal litter formed as a paper and wood composition treated with a surfactant.

The above patents and published patent applications are incorporated herein by reference. The present invention best reflects improvements upon the applicant's work described in U.S. Pat. No. 9,662,634 disclosing an absorption material formed as a pelletized composite blend of agricultural fibers and a superabsorbent polymer. The patent describes this composition as used to solidify liquids in the waste stream for transport and disposal. This technology has been commercialized successfully by the patentee, and current applicant, Martlin Distributing LLC under the brand POWER PELLETS®. The pellet density from the patented and commercial process, namely about 42 to 45 LBS/cubic feet, resulted in the need for a "crumbler" mill or the need to make unusually short pellets for immediate performance. In other words, due to the intense compression of pellets leaving the mill in the process of the '634 patent, and customers desiring a product that performs immediately, the pellets were made very short by turning the knives "in" nearest the pellet die or run through a crumbling process that breaks the pellets There remains a need in the art to a simple cost effective pelletized agricultural fiber based compositions for liquid solidification and moisture retention.

SUMMARY OF THE INVENTION

The various embodiments and examples of the present invention as presented herein are understood to be illustrative of the present invention and not restrictive thereof and are non-limiting with respect to the scope of the invention.

One example of the present invention provides a pelletized composition for liquid solidification and moisture retention comprising (a) at least 60% by weight agricultural fibers; and (b) 0.1-20% by weight superabsorbent polymer, wherein the pellets are substantially uniform and have a density of less than 40 LBS/Cubic Foot.

One aspect of the present invention provides a method of using a pelletized composition for liquid solidification and moisture retention, the method comprising the steps of A) Providing a pelletized absorption material having i) at least 60% by weight agricultural fibers; and ii) 0.1-20% by weight superabsorbent polymer, wherein the pellets are substantially uniform and have a density of less than 40 LBS/Cubic Foot; and B) Blending the pelletized absorption material with one of i) Sludge, ii) Landfill leachate; iii) material used in hydroseeding; iv) grass seeds, fertilizer, and/or mulch to form a soil amendment; v) settling pond; and vi) wastewater streams.

One aspect of the present invention provides a method for making the pelletized composition for liquid solidification and moisture retention. The method of forming pelletized composition for liquid solidification and moisture retention, the method comprising the steps of: (a) adding agricultural fibers to a pellet mill wherein the agricultural fibers are at least 60% by weight agricultural fibers of the pelletized composition; and (b) adding superabsorbent polymer to a pellet mill wherein the superabsorbent polymer are 0.1-20% by weight superabsorbent polymer of the pelletized composition, and (c) forming pellets in the pellet mill including the agricultural fibers and the superabsorbent polymer, wherein the pellets are substantially uniform and have a density of less than 40 LBS/Cubic Foot.

These and other advantages of the present invention will be clarified in the description of the preferred embodiments taken together with the attached figures.

BRIEF DESCRIPTION OF THE FIGURES

FIG. 1 is a schematic view of a radial die pellet mill which may be used for forming the pelletized compositions for liquid solidification and moisture retention according the present invention.

FIG. 2 is a schematic view of a radial die pellet mill forming the pelletized compositions for liquid solidification and moisture retention according the present invention.

DESCRIPTION OF THE PREFERRED EMBODIMENTS

Figure 3A:
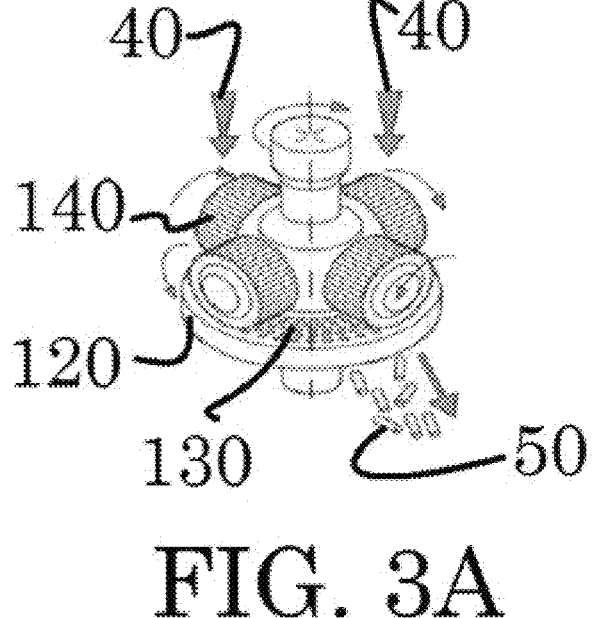
FIGS. 3A and 3B are schematic views of an axial die pellet mill forming the pelletized compositions for liquid solidification and moisture retention according the present invention.

The present invention provides a pelletized composition 50 for liquid solidification and moisture retention and methods of making and methods of using the same. The terms material 50, composition 50 and pellets 50 are all used herein to define the pelletized composition 50 of the present invention.

The pelletized composite absorption material 50 according to the present invention is composed primarily of agricultural fibers 10 in the range of 60-98% by weight of the composition 50. Agricultural fibers 10 include, but are not limited to hard wood, soft wood, cotton, oat hulls, corn cob, peanut hulls, cottonseed hulls, straws (e.g., wheat straw, rice straw), grasses (e.g., switchgrass, esparto grass), reed, bagasse, bamboo fiber, coconut husk, jute fiber, banana fiber, bristle coir fiber, coco fiber, husk fiber, ramie, jute flax, dogbane, hemp, hoopvine, kenef, linden bast, nettles, abaca, sisal, bowstring hemp, henequen, phormium, yucca, kapok, milkweed, and luffa.

The following chart is of typical fiber dimensions for a range of agricultural fibers 10 suitable to form the composition 50:

| Fiber dimensions | | |
| --- | --- | --- |
| Source of pulp | Fiber length, mm | Fiber diameter, μm |
| Softwood | 3.1 | 30 |
| Hardwood | 1.0 | 16 |
| Wheat straw | 1.5 | 13 |
| Rice straw | 1.5 | 9 |
| Esparto grass | 1.1 | 10 |
| Reed | 1.5 | 13 |
| Bagasse | 1.7 | 20 |
| Bamboo | 2.7 | 14 |
| Cotton | 25.0 | 20 |

The pelletized composite absorption material 50 according to the present invention may comprise a compressive strength additive 20 as an option in present in amounts of 0-20% by weight of the composition 50. When present in the material 50, the compressive strength additive 20 is typically present in amounts of 0.1-20% by weight of the material 50, and more commonly in amounts of 1-20% by weight of the material 50, and often in amounts of 4-20% by weight of the material 50 Specifically, the compressive strength additive 20 may be Portland cement, calcium, calcium silicates, limestone, silica, mica, sodium bentonite, combinations thereof, and possibly other minerals to assist in increasing the compressive strength of treated material for improving certain applications.

The pelletized composite absorption material 50 according to the present invention comprises one, or a combination of, Superabsorbent Polymers (SAPs) 30 forming 0.1% to 20% by weight of the pellets 50. SAPs 30 are materials that have the ability to absorb and retain large volumes of water and aqueous solutions which makes them ideal for use in this water absorbing application. SAPs generally are divided into two main classes; i.e., synthetic (petrochemical-based) and natural (e.g., polysaccharide- and polypeptide-based). Some SAP may be made from chemically modified starch and cellulose and other polymers like poly(vinyl alcohol) PVA, poly(ethylene oxide) PEO all of which are hydrophilic and have a high affinity for water. When lightly cross-linked, chemically or physically, these polymers became water-swellable but not water-soluble. A preferred SAP 30, sodium poly-acrylate, may be made from partially neutralized, lightly cross-linked poly(acrylic acid), which has been proven to give the best performance versus cost ratio. Sodium poly-acrylate is manufactured at low solids levels for both quality and economic reasons, and is dried and milled in to granular white solid. Granular poly-acrylate with a particle size of 200-1000 microns is preferred in the present invention for forming at least 50% of the SAP 30 in the pelletized composite absorption material 50, more preferably 90-100% of the SAP 30 in the pelletized composite absorption material 50 of the present invention. This range of particle size of SAP 30 has improved the properties of the resulting pellet 50 over prior pellets that utilized SAP particles of less than 100 microns in size.

The absorption material described herein is made into pellets 50 using a large scale, commercial pellet mill 100 where superabsorbent polymer 30 and compressive strength additive 20 (if present) is introduced to the fibers 10 in a feedline 110 (which may merely be a hopper) to form the raw material 40 prior to pelletizing by the pellet mill 100. The SAP 30 is therefore integrated into the fibers 10 as the fibers 10 are compressed into pellets 50.

Figure 3B:
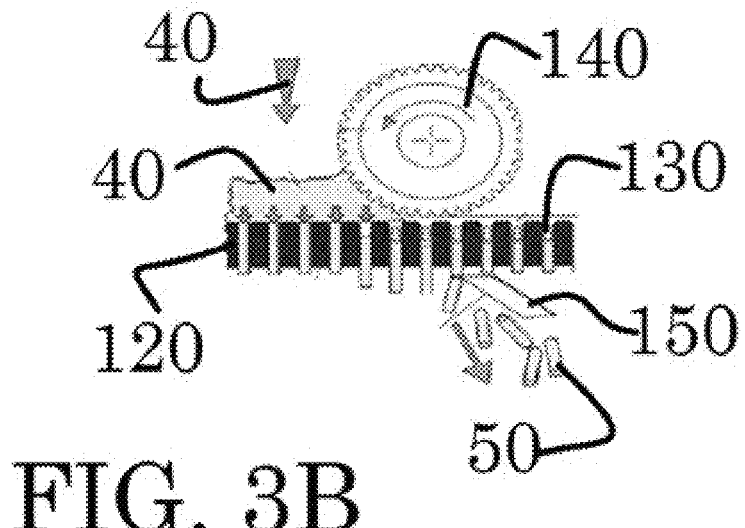

FIG. 1 is a schematic view of a radial die pellet mill 100 which may be used for forming the pelletized compositions for liquid solidification and moisture retention according the present invention. Alternative pellet mill 100 configuration such as the axial mill 100 of FIGS. 3A and 3B could also be used. Regardless of the arrangement of the mill 100, the mill 100 includes a feedline 110 in which the materials 10, 20 and 30 are added to form the raw material 40 for forming the pellets 50. The mill 100 includes a die 120 with die openings 130 through which the raw material 40 is pressed by roller 140 and severed by knife 150 to form the final pellet 50.

The operational parameters of the mill 100 are adjusted such that the density of the resulting pellets 50 is less than 40 lbs/cubic foot, preferably 35-38 lbs/cubic foot and more preferably 36-37 lbs/cubic foot. The average individual length of pellets 50 is less than 1½ inch, and often less than an inch, and preferably less than ½ an inch in length. The speed of the mill 100 and diameter of the openings 130 (if speed alone cannot adequately adjust the density of the pellet 50) is what is primarily adjusted to reach the desired pellet density. Typically the openings 130 are 6-20 millimeter in effective diameter, and more commonly 8-10 millimeter in effective diameter. The openings 130 are often circular but do not have to be as oval and square shapes are known. The term effective diameter references the diameter of a circle having the same cross sectional area as the opening 130.

The designated composition 50 and the pellet density allow the crumbling operation and associated crumbling mill of the prior process to be avoided in its entirety, yielding substantially uniform pellets and substantially uniform results. The term substantially uniform pellets defines, herein, that 90% of the pellets 50 in a produced batch will be within +/−10% of the same standard length and weight and density when delivered to a worksite.

The elimination of the crumbles or crumbled pellets of the prior art results in less dust in the product of the present invention and easier transportation of the pellets 50 of the present invention. The pellets 50 of the present invention are well suited for pneumatic transport and delivery. The less dense pellets 50 of the present invention compared with the prior art are easier to move. Further the prior art pellets are harder and brittle such that there is greater disintegration upon transport than the pellets 50 of the present invention.

Consider the treatment of sludge with the pellets 50 of the present invention. The pneumatic transport may be, for example, the loading of bulk product, namely pellets 50 of the present invention, from a pressurized tanker truck to a silo for metered dosing of the pellets 50 as an additive into a pug-mill mixing based on volume of sludge being processed. Silos in this particular application can filled a plurality of additives, additional to the pellets 50, to be blended with the sludge for stiffening, drying and remediation results.

The pelletized composite absorption material 50 according to the present invention is useful for treating wastewater streams in the oil and gas industries. The pellets 50 may be implemented in drill cutting treatment, in the horizontal and directional drilling fields for waste water treatment, in hydro-excavation fields, in pipeline environments and industrial vacuum applications.

The pellets 50 of the present invention further have application in environmental remediation, such as lagoon or settling pond remediation. The pellets 50 of the present invention can be easily distributed, such as via pneumatic transport, over the standing water of a settling pond to solidify the standing water. The solidified settling pond water may be removed and the underlying soil remediated in an appropriate fashion.

The pelletized composite absorption material 50 according to the present invention may be effectively used as a soil amendment additive ability to retain moisture in dry soils allows/promotes plant growth in arid soil. As a representative example where trees are being planted in arid environments the pellets 50 may be placed in the planting holes before the root ball of the trees to facilitate moisture retention.

The pelletized composite absorption material 50 according to the present invention may be effectively used as a soil amendment additive on the surface of the ground by being mixed with grass seeds, fertilizer, mulch and the like before the mixture is broadcast over a surface. A mechanical rotary spreader, or broadcaster, which is a conventional tractor or other farm vehicle attachment, may be used for distribution of the pelletized composite absorption material 50 mixed with grass seeds, fertilizer, mulch and the like.

The pelletized composite absorption material 50 according to the present invention may be effectively used mixed with material used in hydroseeding, Hydroseeding (or hydraulic mulch seeding, hydro-mulching, hydraseeding) is a planting process that uses a slurry of seed and mulch. Hydroseeding is often used as an erosion control technique on construction sites, as an alternative to the traditional process of broadcasting or sowing dry seed. The pelletized composite absorption material 50 is mixed with the seeds, fertilizer and mulch for hydroseeding. The pelletized composite absorption material 50 will significantly improve moisture retention and yield improved hydroseeding results.

The ease of pneumatic transport of the pelletized composite absorption material 50 according to the present invention may allow an alternative to hydroseeding to be used, namely purely pneumatic distribution of the pelletized composite absorption material 50 together with grass seeds, fertilizer, mulch and the like. In this embodiment grass seed and fertilizer may be added in the pelletizing process, wherein the pellets comprise 5-15% by weight grass seed and fertilizer, 0.1-20% by weight SAP and 65%-94.9% by weight agricultural fibers yielding a density of the resulting pellets which is less than 40 lbs/cubic foot, preferably 35-38 lbs/cubic foot and more preferably 36-37 lbs/cubic foot.

The pelletized composite absorption material 50 according to the present invention may be effectively used for Landfill leachate management, essentially used to solidify the leachate for disposal.

While this invention has been particularly shown and described with references to the preferred embodiments thereof, it will be understood by those skilled in the art that various changes in form and details may be made therein without departing from the scope of the invention.

What is claimed is:

1. A method of using a pelletized composition for liquid solidification and moisture retention, the method comprising the steps of A) Providing a pelletized absorption material having
   i) at least 60% by weight agricultural fibers; and
   ii) 0.1-20% by weight superabsorbent polymer, wherein the pellets are substantially uniform and have a density of less than 40 LBS/Cubic Foot; and B) Blending the pelletized absorption material with one of
   i) Sludge,
   ii) Landfill leachate;
   iii) material used in hydroseeding;
   iv) grass seeds, fertilizer, and/or mulch to form a soil amendment;
   v) settling pond; and
   vi) wastewater streams.

7

8

2. The method of using a pelletized composition according to claim 1 wherein the pelletized absorption material is transported pneumatically.

3. The method of using a pelletized composition according to claim 2, wherein the pellets have a density of 35-38 lbs/cubic foot and wherein the Blending the pelletized absorption material is with one of Sludge, Landfill leachate; and a settling pond.

4. The method of using a pelletized composition according to claim 2, wherein the pellets have a density of 36-37 lbs/cubic foot.

5. The method of using a pelletized composition according to claim 4, wherein the average individual length of pellets is less than an inch and wherein the Blending the pelletized absorption material with one of material used in hydroseeding, grass seeds, fertilizer, and mulch to form a soil amendment.

6. The method of using a pelletized composition according to claim 4, wherein the average individual length of pellets is less than ½ an inch in length and wherein the Blending the pelletized absorption material is with sludge or Landfill leachate.

7. The method of using a pelletized composition according to claim 4, wherein granular poly-acrylate with a particle size of 200-1000 microns forms at least 50% of the SAP in the pelletized composite absorption material and wherein 90% of the pelletized absorption material produced are within +/−10% of the same standard length and weight and density when blended.

8. The method of using a pelletized composition according to claim 4, wherein granular poly-acrylate with a particle size of 300-1000 microns forms 90-100% of the SAP in the pelletized composite absorption material and wherein 90% of the pelletized absorption material produced are within +/−10% of the same standard length and weight and density when blended.

9. The method of using a pelletized composition according to claim 4, further including a compressive strength additive wherein the compressive strength additive is formed of one of Portland cement, calcium, calcium silicates, limestone, silica, mica, and combinations thereof, and is present in amounts of 1-20% by weight of the material.

10. A method of forming pelletized composition for liquid solidification and moisture retention, the method comprising the steps of:

(a) adding agricultural fibers to a pellet mill wherein the agricultural fibers are at least 60% by weight agricultural fibers of the pelletized composition; and (b) adding superabsorbent polymer to the pellet mill wherein the superabsorbent polymer are 0.1-20% by weight superabsorbent polymer of the pelletized composition, and (c) adding a compressive strength additive to the pellet mill wherein the compressive strength additive is formed of one of Portland cement, calcium, calcium silicates, limestone, silica, mica, and combinations thereof, and is present in amounts of 1-20% by weight of the pelletized composition, and (d) forming pellets in the pellet mill including the agricultural fibers, the compressive strength additive and the superabsorbent polymer, wherein the pellets are substantially uniform wherein 90% of the pellets are within +/−10% of the same standard length and weight and density and have a density of less than 40 LBS/Cubic Foot.

11. A pelletized composition for liquid solidification and moisture retention, the pelletized absorption material comprising:

(a) at least 60% by weight agricultural fibers; and (b) 0.1-20% by weight superabsorbent polymer, wherein the pellets are substantially uniform wherein 90% of the pellets are within +/−10% of the same standard length and weight and density and have a density of less than 40 LBS/Cubic Foot.

12. The pelletized composition according to claim 11, wherein the pellets have a density of 35-38 lbs/cubic foot and the pellets have an effective diameter of 6-20 millimeters.

13. The pelletized composition according to claim 11, wherein the pellets have a density of 36-37 lbs/cubic foot and the pellets have an effective diameter of 8-10 millimeters.

14. The pelletized composition according to claim 12, wherein the average individual length of pellets is less than an inch.

15. The pelletized composition according to claim 12, wherein the average individual length of pellets is less than ½ an inch in length.

16. The pelletized composition according to claim 12, wherein granular poly-acrylate with a particle size of 200-1000 microns forms at least 50% of the SAP in the pelletized composite absorption material.

17. The pelletized composition according to claim 12, wherein granular poly-acrylate with a particle size of 200-1000 microns forms 90-100% of the SAP in the pelletized composite absorption material.

18. The pelletized composition according to claim 12, further including a compressive strength additive present in amounts up to 20% by weight of the material.

19. The pelletized composition according to claim 18, wherein the compressive strength additive is formed of one of Portland cement, calcium, calcium silicates, limestone, silica, mica, and combinations thereof, and is present in amounts of 1-20% by weight of the material.

20. The pelletized composition according to claim 19, wherein the compressive strength additive is present in amounts of 10-20% by weight of the material.

\* \* \* \* \*